Figure 1:
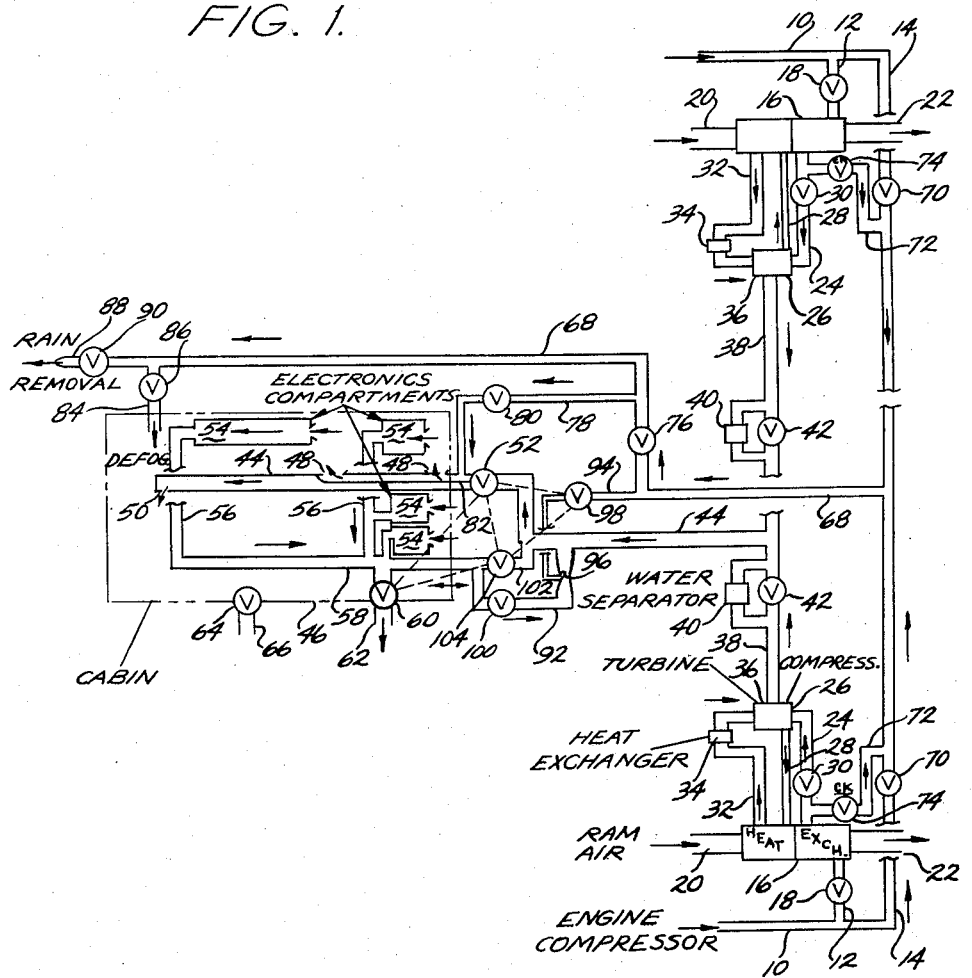

Jan. 27, 1959           S. G. BEST           2,870,698

RECIRCULATING FLOW AIRCRAFT AIR CONDITIONING SYSTEM

Filed April 30, 1957

INVENTOR.
STANLEY G. BEST
BY
Teller & McCormick
ATTORNEYS

United States Patent Office 2,870,698
Patented Jan. 27, 1959

2,870,698

RECIRCULATING FLOW AIRCRAFT AIR CONDITIONING SYSTEM

Stanley G. Best, Manchester, Conn., assignor to United Aircraft Corporation, East Hartford, Conn., a corporation of Delaware Application April 30, 1957, Serial No. 656,091

8 Claims. (Cl. 98—1.5)

This invention relates to an improved air conditioning system for an aircraft cabin and other compartments.

It is the general object of the invention to provide a substantially foolproof system for air conditioning a plurality of aircraft compartments having different cooling requirements, and to provide such a system which is particularly adapted to recirculate some of the flow in the system to satisfy the cooling requirements under certain conditions and which is also adapted for reverse flow through the plurality of compartments to satisfy the requirements when certain other conditions prevail.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing comprises a schematic illustration of a presently preferred embodiment of an aircraft air conditioning system constructed in accordance with the present invention.

Any source of compressed air may be used to supply the system shown in the drawing, but since the system is to be used in an aircraft, it is particularly adapted to utilize hot compressed air from the compressor of an aircraft engine and, preferably, the system is adapted for connection to two engine compressors whereby the said compressors share the supply load. Obviously, in a single engine aircraft, or in a multi-engine installation where only one supply source is desired, the system can be adapted for connection to but one source of supply. In the preferred form where two compressed air sources are used, the air from both sources is directed into a cold air line and into a hot air line before introduction to the aircraft cabin and/or the other compartments thereof. The air conditioning system, whether it uses one or more sources of supply, comprises a cold air circuit and a hot air circuit, the cold air circuit including air refrigerating apparatus and the cold air line for the aircraft compartments, and the hot air circuit including the hot air line to the compartments and flow control elements therein. In the preferred form where two supply sources are utilized, the refrigerating apparatus is duplicated in the cold air circuits between the cold air line and the two sources of supply and the hot air circuits are duplicated between the hot air line and the said sources of supply. Therefore, in describing the air conditioning system as shown on the drawing, it will be necessary to have specific reference only to one of the cold air circuits and to one of the hot air circuits, the other cold and hot air circuits being duplicates thereof.

There is one supply manifold 10 provided in the air conditioning system for each engine compressor to receive hot compressed air bled therefrom. Each manifold 10 includes a conduit 12 connected with a cold air circuit and a conduit 14 connected with a hot air circuit. The conduit 12 in the cold air circuit extends to a multi-stage air-to-air heat exchanger 16, but a shut-off valve 18 is disposed in the conduit 12 between the supply manifold 10 and the said heat exchanger. Preferably, the shut-off valve 18 is operated by the aircraft pilot.

In preferred form, the multi-stage heat exchanger 16 is adapted to utilize ram air flowing therethrough from an inlet 20 to an outlet 22. A jet pump (not shown) utilizing engine bleed air from the manifold 10 can be incorporated to induce flow through the heat exchanger 16 and the ram air conduits 20 and 22 when necessary, as for example, during ground operation of the aircraft. The hot compressed air from the manifold conduit 12 is passed through the first stage of the heat exchanger 16 in out-of-contact heat exchange relationship with the ram air whereby it is cooled before it is discharged in a conduit 24. The conduit 24 extends to a turbine driven air compressor 26 wherein the air is compressed and some heat is restored before it is returned to the second stage of the heat exchanger 16 through a conduit 28. A throttle valve 30, preferably automatically operated responsive to temperature or to temperature change, is disposed in the conduit 25 to control the flow therein and thus to control the flow in the cold air circuit. While no part of the present invention, means are preferably provided for coordinating the operation of the two throttle valves 30, 30 so that there will be substantially equal flow in the two air circuits connected to the main cold air conduit for the aircraft compartments.

In passing through the second stage of the air-to-air heat exchanger 16, the cold air supply is further cooled before discharge from the said second stage in a conduit 32. The conduit 32 directs the air flow through additional refrigerating elements in the cold air circuit which elements may comprise an air-to-water heat exchanger 34 and a turbine 36. The air-to-water heat exchanger 34 may comprise a water boiler and the air flowing in the conduit 32 is cooled by boiling the water in the said heat exchanger. The flowing air is further cooled by expansion in the turbine 36 which may be utilized to advantage in driving the previously mentioned air compressor 26.

The expanded air upon leaving the turbine 36 is directed in a conduit 38 through a water separator 40, or through a by-pass valve 42, to the main cold air conduit 44 which extends to the aircraft compartments. The water separator 40 removes moisture from the air to prevent fog from forming in the aircraft compartments and it also serves as an air filter. The water separator by-pass valve 42 is preferably pressure responsive and is adapted to open so that the flowing air will by-pass the water separator at all pressure altitudes above a selected level, for example 30,000 feet, above which there is little or no moisture to be found in the air. Preferably, the by-pass valve 42 is also constructed and arranged to function as a pressure relief valve to set a maximum duct pressure upstream of the water separator.

It should be understood at this point that the aforedescribed refrigerating elements and apparatus are mentioned for example only and that other refrigerating devices can be employed to cool the air ducted from the engine compressor and introduced to the cold air conduit 44.

The cold air conduit 44 is extended into the aircraft cabin 46 and has a plurality of outlets for supplying cold pressurized air to a plurality of stations therein. For example, the conduit 44 within the cabin 46 may have a pair of outlets 48, 48 in a rear crew station and it may have an outlet 50 at the front of the cabin for the pilot's station or space. A normally open shut-off valve 52 is located in the conduit 44 adjacent the point where it enters the cabin 46. This valve is closed only during reverse flow operation as will be described.

As previously mentioned, the air from the cold air conduits 44 is supplied to the cabin 46 under pressure. The cabin pressure forces the air therewithin through a plurality of cabinets or compartments 54, 54 provided with suitable inlet openings and having conduits 56, 56 which are connected to an air discharge manifold 58. The compartments 54, 54 contain electronic equipment or other apparatus which must be air cooled. A valve 60 is disposed in the outlet conduit 62 of the discharge manifold 58, the valve 60 normally operating as a modulating valve to regulate cabin pressure. That is, the valve 60 normally operates to open automatically and to discharge the air after it has passed through the cabin 46 and the compartments 54, 54. A cabin air relief or dump valve 64 is provided in a cabin outlet 66 to maintain a maximum pressure level in the cabin 46 and the relief valve 64 is preferably coordinated with the discharge valve 50 to maintain cabin pressure at a selected amount greater than the duct pressure in the valve 60 or downstream of the compartments 54, 54.

The hot air circuit for each engine compressor is quite simple, the hot air conduit 14 of each compressor manifold 10 being connected directly to the single hot air supply conduit 68 which extends toward the cabin 46. Flow in the hot air circuit is controlled by a temperature and/or pressure responsive modulating valve 70 which is disposed in the conduit 14 and which is operated to maintain a desired temperature in the hot air conduit 68. If the valve 70 is fully closed due to excessive temperature on the upstream side of said valve, warm air is supplied to the conduit 14 on the downstream side of the modulating valve 70 from a conduit 72 interconnecting the conduit 14 and the conduit 24 which carries warm air from the first stage of the air-to-air heat exchanger 16. A check valve 74 in the conduit 72 will open when pressure is reduced in the conduit 14 downstream of the modulating valve 70, this occurring when the said modulating valve is closed.

The hot air stream flowing in the second supply conduit 68 is normally utilized for three purposes, to add warm air to the cabin air flow when desired or necessary, to supply a stream for removing fog from the pilot's space and from the windshield, and to provide a stream for removing rain from the outside of the windshield. A pressure regulating valve 76 is disposed in the hot air conduit 68 to regulate the pressure therein before the air is discharged from the conduit for the latter two of the aforementioned purposes. The air utilized to warm the cabin passes through a duct 78 on the downstream side of the valve 76 and is connected with the main or cold air conduit 44 adjacent the point where it enters the cabin 46. A manually controlled throttle valve 80 is disposed in the duct 78 to control the hot air flow into the main supply conduit 44. In most cases, it will be necessary to add warm air to the cabin supply only for comfort in the rearmost cabin station or stations, because the pilot's forward station is warmed by the sun and he can add warm air by means of the de-fogging control as will be described. In order that the rear stations can be warmed without substantially changing the temperature of the flow to the pilot's station, a baffle 82 is provided in the main supply duct 44 to direct air from the conduit 78 through the discharge ports 48, 48. The warm air from the conduit 78 is mixed with the cold air in the duct 44 prior to discharge at the aforesaid ports.

The hot air for de-fogging the windshield and for heating the pilot's space is directed into the forward station of the cabin 46 through a conduit 84 which is connected with the hot air supply conduit 68. Hot air flow in the conduit 84 is regulated by a pilot controlled valve 86.

The pilot also controls the flow of hot air to the rain removal device 88 by means of a combination throttle valve at shut-off valve 90.

While the previously mentioned manually controlled throttle valves 80 and 86 may be used to control cabin temperature at the different stations, it is an important feature of the present invention that the system utilizes additional, preferably automatically operable means for controlling cabin temperature. In accordance with this feature of the invention, at least a portion of the air which has circulated through the cabin and the electronic compartments, and which has been warmed as a result of such circulation, is recirculated by being re-introduced to the cabin through the main supply duct 44. The recirculated warm air increases the cabin temperature.

In order to provide for air recirculation, a conduit 92 is connected between the discharge manifold 58 (preferably upstream of the valve 60) and the main supply conduit 44. A hot air duct 94 is extended from the second or hot air supply conduit 68 into the recirculating conduit 92 and the end of the hot air duct 94 is provided with a jet nozzle 96. This provides a jet pump in the recirculating conduit 92 which utilizes high pressure hot air to induce the flow of warm air from the discharge manifold 58 to the main or cold air supply conduit 44. A recirculating valve 98 is located in the hot air duct 94 to the jet nozzle 96 and, preferably, the valve 98 is adapted to be opened and closed by means (not shown) sensitive to and responsive to cabin temperature. Thus, the recirculating valve 98 can be opened automatically to cause recirculation of the warm air until the cabin temperature reaches a preselected level, at which time the valve 98 can be automatically closed. A check valve 100 is located in the recirculating conduit 92 to prevent reverse flow therein when the recirculating valve 98 is closed.

Now, obviously, the present system as thus far described provides alternative means for warming the cabin air supply; by recirculation or by introducing warm air thereto through the conduits 68 and 78. Recirculation is preferred because there is less demand made on the supply. Since engine compressor bleed air is used for the supply, any reduction made in supply demands reduces the engine power drain. In other words, recirculation is preferred because it economizes on supply flow and permits the use of low temperature supply flow without overcooling.

It is a further feature of the present invention that reverse flow is to be accommodated under certain conditions. That is, when the cabin, which is normally closed and capable of retaining air under pressure, is de-pressurized in flight or when the cabin canopy is open on the ground, the electronic equipment will not be sufficiently cooled by air from the cabin since there is no cabin pressure causing the air to flow. Under these conditions, it is still desirable to cool the electronic compartments, and the system is adapted to accommodate reverse flow through the electronic compartments and then into the cabin. Such reverse flow takes place in a conduit 102 extending between the cabin discharge manifold 58 and the cold air conduit 44. A normally closed valve 104 is located in the conduit 102, the valve 104 being opened only when reverse flow takes place. At the same time that the reverse flow valve 104 is opened, the normally open cabin inlet valve 52 is closed as are the recirculating valve 98 and the cabin pressure regulating and discharge valve 60. While the valves 52, 60, 98 and 104 may be manually operated or controlled for reverse flow operation of the air conditioning system, they are preferably controlled by temperature responsive means which will close the valves 52, 60, and 98 at a preselected, abnormally high temperature in the electronic compartments and at the same time open the reverse flow valve 104. While the valve 98 in the hot air line 94 to the jet nozzle 96 is normally closed during reverse flow operation, it may be opened by temperature responsive means to introduce some hot air from the nozzle to avoid undesirably low temperatures in the electronic compartments during the said reverse flow operation.

Also during reverse flow, i. e., during flow from the main or cold air conduit 44 through the electronic compartments 54, 54 into the cabin 46, the cabin pressure relief valve 64 acts as a pressure regulator. The relief valve 64 will open at the preselected relief pressure and will discharge the cabin air at that pressure.

Thus, the air conditioning system provided in accordance with the present invention normally operates to provide a temperature conditioned air stream into the aircraft cabin and then from the cabin through the electronic compartments from whence it is discharged overboard. During such normal circulation, or flow in the normal direction, some of the air which is warmed by circulation through the cabin and electronic compartments can be recirculated to raise the temperature level if an increased temperature is needed. The same system operates to reverse the direction of flow so as to direct the air stream through the electronic compartments and then through the cabin and overboard when the cabin is de-pressurized. This reverse flow operation provides assurance that the electronic compartments will at all times receive a cooling air stream.

The invention claimed is:

1. An air conditioning system for a plurality of aircraft compartments which include one normally closed compartment capable of retaining air under pressure, the said system comprising a main supply conduit connectible with a source of air under pressure and opening into the said one compartment, air passage means providing communication between said one compartment and another of said compartments, an air discharge conduit connected with said other compartment, a valve for controlling flow through said discharge conduit whereby to provide air pressure control in said one and other compartments, a recirculating conduit connected for communication between said one compartment and said discharge conduit on the upstream side of said valve, air pumping means disposed in said recirculating conduit to withdraw some of the air discharged from said other compartment and to recirculate the same through said one compartment, and check valve means disposed in said recirculating conduit to prevent flow therein from said one compartment to said discharge conduit.

2. An air conditioning system for a plurality of aircraft compartments which include one normally closed compartment capable of retaining air under pressure and at least one other compartment disposed within the said one compartment, the said system comprising a main supply conduit connectible with a source of air under pressure and opening into the said one compartment, the said other compartment having an opening for the free passage of air from said one compartment, air discharge conduit means connected with said other compartment for the discharge of air externally of said one compartment, a valve for controlling discharge flow from said discharge conduit means whereby to provide air pressure control in said one and other compartments, a re-circulating conduit connected between said main supply conduit and said discharge conduit means on the upstream side of said valve, air pumping means disposed in said re-circulating conduit for withdrawing some of the air discharged from the said other compartment and for re-circulating the same through said one compartment, and a check valve disposed in said re-circulating conduit to prevent flow therein from said supply conduit to said discharge conduit means.

3. An air conditioning system for a plurality of aircraft compartments which include one normally closed compartment capable of retaining air under pressure, the said system comprising a main supply conduit and a second supply conduit both of which are connectible to a source of air under pressure and both of which communicate with said one compartment to supply air thereto under pressure, air passage means providing communication between said one compartment and another of said compartments, an air discharge conduit connected with said other compartment, a valve for controlling flow through said discharge conduit whereby to provide air pressure control in said one and other compartments, a re-circulating conduit in communication with said one compartment and connected with said discharge conduit on the upstream side of said valve, air pumping means disposed in said recirculating conduit to withdraw some of the air discharged from said other compartment for re-circulation through said one compartment, said air pumping means comprising a jet nozzle connected with said second supply conduit and opening into said re-circulating conduit as aforesaid, and a check valve disposed in said re-circulating conduit to prevent flow therein toward said discharge conduit.

4. An air conditioning system for a plurality of aircraft compartments which include one normally closed compartment capable of retaining air under pressure and at least one other compartment disposed within the said one compartment, the said system comprising a main supply conduit and a second supply conduit, both of said supply conduits being connectible with a source of air under pressure and being in communication with said one compartment to supply air thereto, the said other compartment having an opening for the free passage of air from said one compartment, air discharge conduit means connected with said other compartment for the discharge of air externally of said one compartment, a valve for controlling discharge flow through said conduit means whereby to provide air pressure control in said one and other compartments, a re-circulating conduit connected between said main supply conduit and said discharge conduit means on the upstream side of said valve, air pumping means disposed in said recirculating conduit to withdraw some of the air discharged from said other compartment for re-circulation through said one compartment with air in said main supply conduit, the said air pumping means comprising a jet nozzle connected with said second supply conduit and disposed in said re-circulating conduit as aforesaid, and a check valve disposed in said re-circulating conduit to prevent the flow of air from said main supply conduit to said discharge conduit means.

5. An air conditioning system for a plurality of aircraft compartments which include one normally closed compartment capable of retaining air under pressure, the said system comprising a main supply conduit connectible with a source of air under pressure and opening into the said one compartment, a normally open shut-off valve disposed in said supply conduit, air passage means providing communication between said one compartment and another of said compartments, a discharge manifold connected with said other compartment, a discharge valve in said manifold for controlling discharge flow whereby to provide air pressure control in said one and other compartments, a recirculating conduit connected for communication between said one compartment and said manifold on the upstream side of said discharge valve, air pumping means disposed in said recirculating conduit to withdraw some of the air discharged from said other compartment and to recirculate the same through said one compartment, check valve means disposed in said recirculating conduit to prevent flow therein from said one compartment to said discharge conduit, a reverse flow conduit connected between said supply conduit and said manifold on the respective upstream sides of said shut-off and discharge valves, and a normally closed valve disposed in said reverse flow conduit, the said system operating normally to supply air by flow from said supply conduit through said one and other compartments in series but operating when said normally open and closed valves are closed and opened, respectively, to supply air by flow from said supply conduit through said other and one compartments in series.

6. An air conditioning system for a plurality of aircraft compartments which include one normally closed compartment capable of retaining air under pressure and at least one other compartment disposed within the said one compartment, the said system comprising a main supply conduit connectible with a source of air under pressure and opening into the said one compartment, a normally open shut-off valve disposed in said supply conduit, the said other compartment having an opening for the free passage of air to and from said one compartment, a discharge manifold connected with said other compartment for the discharge of air externally of said one compartment, a valve in said manifold for controlling discharge flow therefrom whereby to provide air pressure control in said one and other compartments, a recirculating conduit connected between said main supply conduit and said discharge manifold on the upstream side of said discharge valve and on the upstream side of said shut-off valve, air pumping means disposed in said recirculating conduit for withdrawing some of the air discharged from said other compartment and for recirculating the same through said one compartment, a check valve disposed in said recirculating conduit to prevent flow therein from the supply conduit to said manifold, a reverse flow conduit connected between said supply conduit and said manifold on the respective upstream sides of said shut-off valve and said discharge valve, and a normally closed valve in said reverse flow conduit, the said system operating normally to supply air by flow from said supply conduit through said one and other compartment in series but operating when said normally open and closed valves are closed and opened respectively, to supply air by flow from said supply conduit through said other and one compartments in series.

7. An air conditioning system for a plurality of aircraft compartments which include one normally closed compartment capable of retaining air under pressure, the said system comprising a main supply conduit and a second supply conduit both of which are connectible to a source of air under pressure and both of which communicate with said one compartment to supply air thereto under pressure, a normally open shut-off valve disposed in said main supply conduit, air passage means providing communication between said one compartment and another of said compartments, an air discharge manifold connected with said other compartment, a valve in said manifold for controlling discharge flow therefrom whereby to provide air pressure control in said one and other compartments, a recirculating conduit in communication with said one compartment and connected with said manifold on the upstream side of said discharge valve, air pumping means disposed in said recirculating conduit to withdraw some of the air discharged from said other compartment for recirculation through said one compartment, said air pumping means comprising a duct connected with said second supply conduit and having a nozzle opening into said recirculating conduit as aforesaid and also comprising a recirculating valve disposed in said nozzle conduit, a check valve disposed in said recirculating conduit to prevent flow therein toward said manifold, a reverse flow conduit connected between said main supply conduit and said manifold on the respective upstream sides of said shut-off and discharge valves, and a normally closed valve disposed in said reverse flow conduit, the said system operating normally to supply air by flow from said supply conduit through said one and other compartments in series but operating when said normally open and closed valves are closed and opened, respectively, and when said recirculating valve is closed to supply air by flow from said supply conduit through said other and one compartments in series.

8. An air conditioning system for a plurality of aircraft compartments which include one normally closed compartment capable of retaining air under pressure, and at least one other compartment disposed within the said one compartment, the said system comprising a main supply conduit and a second supply conduit both of which are connectible with a source of air under pressure and are in communication with said one compartment to supply air thereto, a normally open shut-off valve disposed in said main supply conduit, the said other compartment having an opening for the free passage of air from said one compartment, a discharge manifold connected with said other compartment for the discharge of air externally of said one compartment, a discharge valve in said manifold for controlling discharge flow therefrom whereby to provide air pressure control in said one and other compartments, a recirculating conduit connected between said main supply conduit and said manifold on the upstream sides of said shut-off valve and said discharge valve, air pumping means disposed in said recirculating conduit to withdraw some of the air discharged from said other compartment for recirculation through said one compartment with air in said main supply conduit, the said air pumping means comprising a conduit connected with said second supply conduit having a jet nozzle disposed in said recirculating conduit as aforesaid and also comprising a valve in said nozzle conduit, a check valve disposed in said recirculating conduit to prevent the flow of air from said main supply conduit to said manifold, a reverse flow conduit connected between said supply conduit and said discharge manifold on the respective upstream sides of the said shut-off and discharge valves, and a normally closed valve in said reverse flow conduit, the said system operating normally to supply air by flow from said main supply conduit through said one and other compartments in series but operating when said normally open and closed valves are closed and opened, respectively, and when said recirculating valve is closed to supply air by flow from said main supply conduit through said other and one compartments in series.

References Cited in the file of this patent

UNITED STATES PATENTS

| | | |
|---|---|---|
| 2,439,793 | Braddon | Apr. 20, 1948 |
| 2,463,487 | Widgery et al. | Mar. 1, 1949 |
| 2,465,162 | Lockwood | Mar. 22, 1949 |
| 2,496,862 | Del Mar | Feb. 7, 1950 |
| 2,814,241 | Silver | Nov. 26, 1957 |